United States Patent [19]
Oehler et al.

[11] Patent Number: 5,630,569
[45] Date of Patent: May 20, 1997

[54] ELECTROMAGNETICALLY ACTUATED VALVE FOR SLIP-CONTROLLED HYDRAULIC BRAKE SYSTEMS IN MOTOR VEHICLES

[75] Inventors: Martin Oehler, Leingarten; Guenther Hohl, Stuttgart; Norbert Mittwollen, Markgroeningen; Hans-Juergen Herderich, Kernen; Stephan Jonas, Gerlingen, all of Germany

[73] Assignee: Robert Bosch GmbH, Stuttgart, Germany

[21] Appl. No.: 465,670

[22] Filed: Jun. 5, 1995

[30] Foreign Application Priority Data

Aug. 19, 1994 [DE] Germany ............. 44 29 211.2

[51] Int. Cl.[6] .................................. F16K 31/06
[52] U.S. Cl. .................. 251/129.15; 137/596.17; 137/625.65; 303/119.2
[58] Field of Search ............ 251/129.15, 129.14, 251/129.22; 137/596.17, 625.65; 303/119.1, 119.2

[56] References Cited

U.S. PATENT DOCUMENTS

| | | |
|---|---|---|
| 4,714,089 | 12/1987 | Ueda et al. .............. 251/129.14 |
| 5,076,538 | 12/1991 | Mohr . | 
| 5,102,095 | 4/1992 | Schmitt-Matzen . |
| 5,269,490 | 12/1993 | Fujikawa et al. ........... 251/129.15 |

FOREIGN PATENT DOCUMENTS

| | | |
|---|---|---|
| 0670445 | 11/1994 | European Pat. Off. . |
| 3934771 | 3/1991 | Germany . |

*Primary Examiner*—Kevin Lee
*Attorney, Agent, or Firm*—Edwin E. Greigg; Ronald E. Greigg

[57] ABSTRACT

An electromagnetically actuated valve which achieves the setting of a reduced cross section of flow following a closed position of the valve. The solenoid valve has a seat valve which is surrounded by a sleeve which is secured pressure-tightly on a valve body. In the closed position of the seat valve, a tappet engages in the sleeve, forming a small radial gap. From the interior of the sleeve, a first pressure-medium passage leads to an end face of a magnet armature, said end face being remote from the seat valve. Outside the sleeve, a second pressure-medium passage leads to that end face of the magnet armature which is close to the seat valve. In the case of a pressure drop between the pressure-medium inlet and the pressure-medium outlet of the solenoid valve, the seat valve can assume a partially open position following a closed position of said valve since, due to the gap, which acts as a restriction, a pressure disequilibrium arises at the magnet armature and valve opening forces are compensated. The valve can be employed in slip-controlled hydraulic brake systems of motor vehicles.

3 Claims, 2 Drawing Sheets

ELECTROMAGNETICALLY ACTUATED VALVE FOR SLIP-CONTROLLED HYDRAULIC BRAKE SYSTEMS IN MOTOR VEHICLES

PRIOR ART

The invention starts from an electromagnetically actuated valve as defined hereafter.

A valve of this kind is known from DE 39 34 771 C1, FIG. 3. It has a control piston which is arranged in the valve dome, forms a stop for the magnet armature and is guided in longitudinally displaceable fashion on a stud which starts from the valve body of the seat valve and passes through the magnet armature. With its end remote from the armature, the control piston delimits a control chamber which is connected by a pressure-medium passage passing coaxially through the stud and the control piston to the pressure-medium inlet of the known valve. While the magnet armature is pressure-balanced on both end faces, pressure fed into the control chamber is capable of displacing the control piston axially against a stop. This reduces the stroke of the magnet armature by a predetermined amount, resulting in restriction of the cross section of flow through the seat valve.

This mode of operation of the known valve can be used in slip-controlled hydraulic brake systems in which the pressure-medium inlet is connected to a brake master cylinder and the pressure-medium outlet is connected to a wheel-brake cylinder. If, in the event of a brake-slip control operation for example, the valve is switched to its closed position by excitation of the magnet coil and a pressure drop of sufficient magnitude is produced between the pressure-medium inlet and the pressure-medium outlet upon reduction of the pressure in the wheel-brake cylinder, this brings about the above-described displacement of the control piston with the result that, when the valve is opened, the above-mentioned restriction of the cross section of flow takes effect as long as the pressure difference between the inlet and the outlet exists. Because of the reduced pressure gradient during the pressure build-up following a pressure reduction during a brake-slip control operation, the reduction in the cross section of flow has a favorable effect on the quality of control and the noise characteristics of the brake system. During a normal braking operation not subject to the danger of locking up, on the other hand, the full cross section of flow of the valve is available and this promotes the desired short response time of the brake system upon brake actuation.

However, in the known valve the fixed setting of the restricted cross section of flow is disadvantageous because the flow rate is, as a result, subject to fluctuations dependent on the differential pressure. In addition, the flow rate is to a quite considerable extent dependent on the absolute size of the cross section of flow, i.e. the stop requires very narrow tolerancing.

ADVANTAGES OF THE INVENTION

In contrast, the solenoid valve according to the invention has the advantage that the cross section of flow of the seat valve after it opens from the closed position settles at largely constant flow rates due to the back pressure which is caused on the inside of the sleeve in the partially open position upstream of the gap forming a restriction and which is transmitted by the first pressure-medium passage to that end face of the magnet armature which is remote from the seat valve, with the result that there occurs at said magnet armature a pressure disequilibrium which gives rise to a force acting in the closing direction of the seat valve and compensates the opening forces acting on the magnet armature together with the tappet and the closing member. The effort involved in construction to ensure that the valve according to the invention operates as a flow control valve in this way is extremely small.

Advantageous further developments and improvements of the solenoid valve specified herein are possible by virtue of the measures presented hereinafter.

BRIEF DESCRIPTION OF THE DRAWING

An exemplary embodiment of the invention is depicted in simplified form in the drawings and explained in greater detail in the following description.

DESCRIPTION OF THE EXEMPLARY EMBODIMENT

Figure 1:
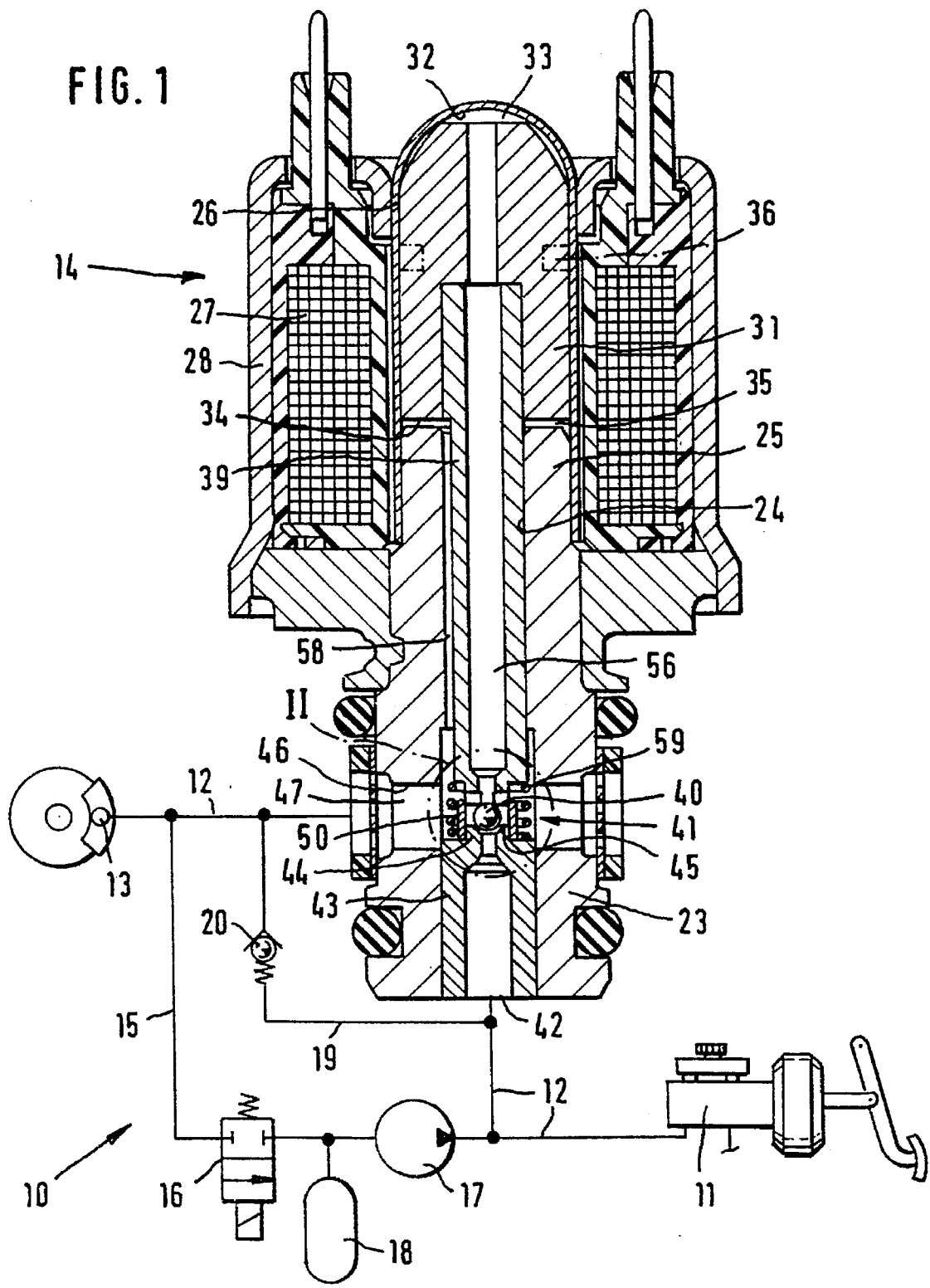
FIG. 1 shows a longitudinal section through an electromagnetically actuated valve in a schematically indicated brake system of a motor vehicle.

A brake-slip-controlled hydraulic brake system 10, depicted in highly simplified form in FIG. 1, of a motor vehicle has a dual-circuit brake master cylinder 11 from which a brake line 12 leads to a wheel-brake cylinder 13. Arranged in the brake line 12 is an electromagnetically actuated valve 14 which acts as an inlet valve during a slip control operation. Emanating from the brake line 12 on the wheel-brake cylinder side is a return line 15 which bypasses the valve 14 and is connected to the brake line on the brake master cylinder side. In the return line 15 there are an outlet valve 16 and a return pump 17 for pressure medium removed from the wheel-brake cylinder 13. A reservoir chamber 18 is connected to the return line 15 between the outlet valve 16 and the return pump 17. Also provided is a bypass line 19 which bypasses the solenoid valve 14 and has a nonreturn valve 20 which opens in the direction from the wheel-brake cylinder 13 to the brake master cylinder 11.

The solenoid valve 14 has a housing 23 with a through hole 24. A sleeve-shaped valve dome 26 is placed on a pole core 25 formed by the housing 23 and is connected pressure-tightly to the housing 23. The valve dome 26 is surrounded by an annular magnet coil 27 with a bell-shaped housing 28.

An essentially circular-cylindrical magnet armature 31 is accommodated in longitudinally moveable fashion in the valve dome 26. At the end remote from the pole core, the magnet armature 31 delimits with its end face 32 a first chamber 33. The end face 34 of the magnet armature 31 at the same end as the pole core adjoins a second chamber 35. At the circumference, the magnet armature 31, around which there is a flow of pressure medium at both end faces 32 and 34, is sealed off from the valve dome 26 by a gap seal or other sealing means 36, indicated merely by chain-dotted lines in FIG. 1, and a pressure-transmitting connection between the two chambers 33 and 35 is thus largely blocked.

Projecting from the magnet armature 31 is a tappet 39 firmly connected to it. This tappet is accommodated with a small radial clearance in the housing bore 24. At its end remote from the armature, the tappet 39 carries a closing member 40 of essentially spherical design of a seat valve 41 in the form of a 2/2-way valve. The closing member 40, which, in the exemplary embodiment, is designed as a full ball, is integrally connected to the tappet 39. A valve body 43 is pressed in from that end of the housing bore 24 which is remote from the armature, the said end forming a pressure-medium inlet 42 of the solenoid valve 14. At the tappet end, the longitudinally bored valve body 43 is provided with a stud-shaped extension 44 on which an internally tapered valve seat 45 of the seat valve 41 is formed. In the region of the seat valve 41, the housing bore 24 is crossed by a transverse hole 46 which forms a pressure-medium outlet 47 connected by the brake line 12 to the wheel-brake cylinder 13. The outlet is provided with a filter 100.

Figure 2:
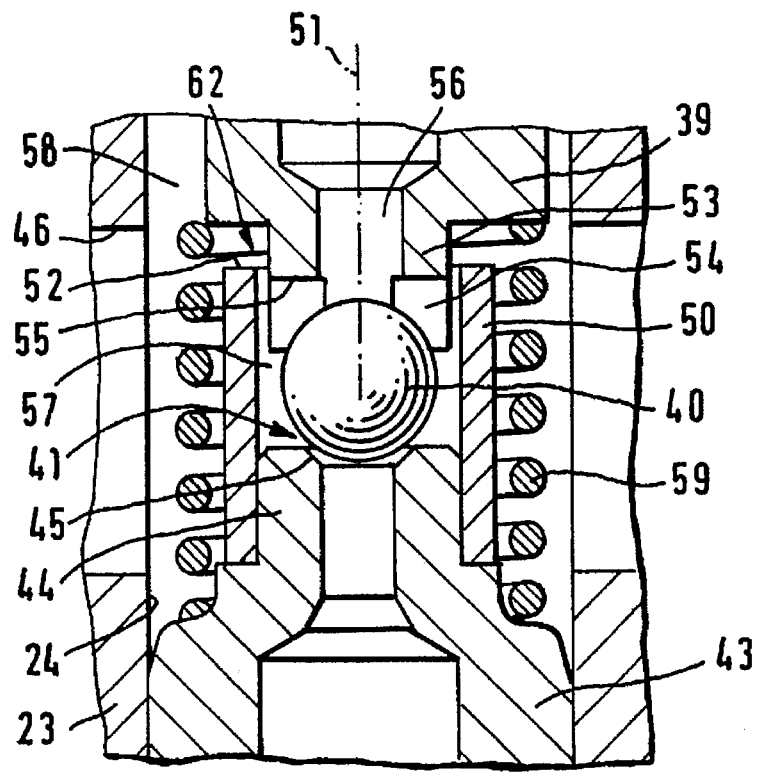
FIG. 2 shows that region of the solenoid valve which is denoted in FIG. 1 by inset II and has a partially open seat valve, on a different scale.
Figure 3:
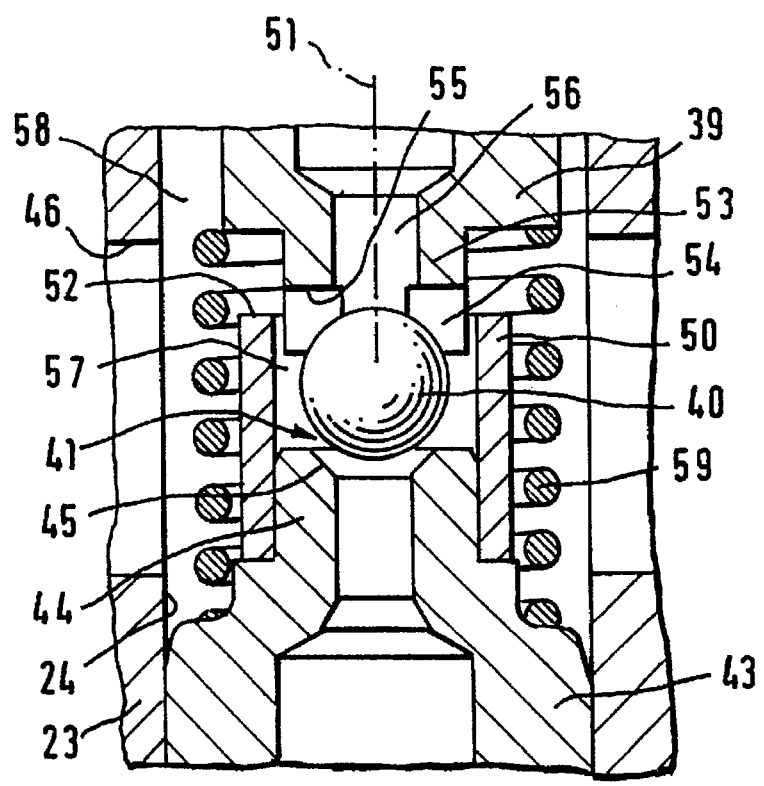
FIG. 3 shows the seat valve in accordance with FIG. 2 in the open position.

As FIGS. 2 and 3 more clearly show, the seat valve 41 is surrounded by a straight, hollow-cylindrical sleeve 50. At the end remote from the tappet, this sleeve is secured in a sealed manner on the extension 44 of the valve body 43. On its inside, the boundary of the sleeve 50 runs parallel to the tappet axis 51 and, in addition, the sleeve is formed with a free end face 52 which runs at right angles to said axis. A stud-shaped section 53 of the tappet 39, which section carries the closing member 40 of the seat valve 41, has a circumferential boundary which likewise runs parallel to the tappet axis 51. Section 53 of the tappet 39 engages in the sleeve 50. It is provided with a groove 54 which crosses the tappet axis 51 at right angles and the bottom end surface 55 of which, like the end face 52 of the sleeve 50, extends at right angles to the tappet axis 51. A first pressure-medium passage 56 passes from the groove 54, through the tappet 39 and the magnet armature 31, to the end face 32 of the magnet armature remote from the seat valve. This pressure-medium passage 56 is connected by the internal space 57 of the sleeve 50 to the outlet of the seat valve 41. On its outside, the sleeve 50 is connected by the transverse hole 46 to the pressure-medium outlet 47 of the solenoid valve 14. At the outlet end of the sleeve 50, a second pressure-medium passage 58 formed by a flat surface on the tappet 39 leads to the end face 34 of the magnet armature 31 near to the seat valve. Finally, a preloaded return spring 59 which surrounds the sleeve 50 is also provided. This spring is supported at one end on the valve body 43 and at the other end at the tappet 39 and holds the seat valve 41 in the open position when the magnet coil 27 is not excited.

The diameters of the sleeve 50 and the tappet 39 with its section 53 at the closing-member end are matched to one another in such a way that, with the tappet engaging in the sleeve, a small radial gap 62 remains between them. This acts as a restriction for as long as the end face 55 of the tappet 39 is situated in the internal space 57 of the sleeve 50 or in the region of the end face 52 of the latter. This is the situation in the case of the partially open position of the seat valve 41, shown in FIG. 2; in the open position of the seat valve, shown in FIG. 3, the restricting effect is canceled owing to the groove 54 of the tappet 39 being in the region of the sleeve end face 52.

The solenoid valve 14 operates as follows:

When a braking operation not subject to the danger of locking up is initiated by the driver of the vehicle, the valve 14 assumes its rest position, i.e. the seat valve 41 is in the open position shown in FIG. 3. The pressure produced by actuation of the brake master cylinder 11 brings about a pressure rise in the wheel-brake cylinder 13 by displacing partial quantities of pressure medium in the brake line 12. In this process, the pressure medium flows from the pressure-medium inlet 42, through the valve body 43 and the valve seat 45 of the seat valve 41 and onward from the internal space 57 of the sleeve 50, through the groove 54 in the tappet 39 and the transverse hole 46, to the pressure-medium outlet 47. During this process, the flow of pressure medium through the solenoid valve 14 is unrestricted. If the driver reduces the brake pressure or ends the braking operation, the pressure medium flows in the opposite direction through the seat valve 41 and, if necessary, through the nonreturn valve 20, connected in parallel, in the bypass line 19.

In the case of a braking operation subject to the danger of locking up, the solenoid valve 14 is switched to the working position by excitation of the magnet coil 27. In this position, the seat valve 41 has been transferred to the closed position by displacement of the magnet armature 31 counter to the force of the return spring 59. At the same time, the outlet valve 16 in the return line 15 is switched to the open position and the return pump 17 is set in operation. By removing partial quantities of pressure medium from the wheel-brake cylinder 13 and pumping back to the brake master cylinder 11, pressure at the wheel brake is reduced, as is the danger of locking up. In the phase for maintaining the pressure in the wheel-brake cylinder 13, which follows a pressure reduction, the solenoid valve 14 remains in the working position while the outlet valve 16 in the return valve 15 is switched to the closed position.

For the pressure build-up in the wheel-brake cylinder 13 following pressure maintenance, the outlet valve 16 retains its closed position and the solenoid valve 14 is no longer supplied with current. Because the magnet coil 27 is not excited, the magnet armature 31 is displaced longitudinally toward the valve dome 26 by the pressure on the closing member 40 generated by the brake master cylinder 11 and by the force of the return spring 59. Due to the opening of the seat valve 41, pressure medium flows from its outlet into the internal space 57 of the sleeve 50 and onward through the gap 62 to the pressure-medium outlet 47. Due to the restrictive effect of the gap 62 between the sleeve 50 and the tappet 39, a pressure drop occurs in the pressure medium, with the result that the pressure prevailing in the internal space 57 of the sleeve 50 is higher than that on its outside. The higher pressure is transmitted by the first pressure-medium passage 56 into the first chamber 33 and there acts on that end face 32 of the magnet armature 31 which is remote from the seat valve. The lower pressure propagates via the second pressure-medium passage 58 into the second chamber 35 and there acts on the end face 34 near to the seat valve. This pressure disequilibrium at the magnet armature 31 together with the tappet 39 gives rise to a resultant force on the armature acting in the direction of the valve seat 45 of the seat valve 41, this force being opposed by the hydraulic opening force on the closing member 40 and the spring force of the return spring 59. These forces balance each other out in a partially open position of the seat valve 41, in which, as shown in FIG. 2, the end face 55 on the tappet 39 occupies a position in the region of the tappet-side end face 52 of the sleeve 50. The quantities of pressure medium flowing from the pressure-medium inlet 42 to the pressure-medium outlet 47 of the solenoid valve 14 are then substantially constant and very much smaller than in the open position of the seat valve 41. In this partially open position, the solenoid valve 14 thus acts like a flow control valve.

In the further course of the brake-slip control operation, the solenoid valve 14 is, in rapid sequence, switched into the closed position of the seat valve 41 by renewed excitation of the magnet coil 27 and into the partially open position described above by switching off the excitation. As the pressure in the wheel-brake cylinder 13 approaches the pressure in the brake master cylinder 11, the pressure disequilibrium at the magnet armature 31 decreases, with the result that, finally, the hydraulic opening force on the closing member 40 and the spring force of the return spring 59 predominate and move the seat valve 41 into the open position defined by the stop of the magnet armature 31 on the valve dome 26. The pressure medium can now flow through the solenoid valve 14 unrestricted.

The foregoing relates to preferred exemplary embodiments of the invention, it being understood that other variants and embodiments thereof are possible within the spirit and scope of the invention, the latter being defined by the appended claims.

We claim:

1. An electromagnetically actuated valve (14), for slip-controlled hydraulic brake systems (10) in motor vehicles, said valve comprising the following features:

a magnet armature (31) is accommodated in longitudinally movable fashion in a valve dome (26), a pressure medium flows around opposite end faces (32, 34) of said magnet armature, the valve dome (26) is surrounded by a magnet coil (27), a tappet (39) projects from the magnet armature (31) and includes a closing member (40) of a seat valve (41), a valve body (43) having a valve seat (45) of the seat valve (41) is arranged in a housing bore (24) of the solenoid valve (14), a bore in said valve body that leads from a pressure-medium inlet (42), a pressure-medium passage (56) leads from the seat valve (41) into the valve dome (26), a circular-cylindrical sleeve (50) surrounds the valve seat (45) and is accommodated in the housing bore (24) coaxially to said valve seat (45), when the magnet coil (27) is not excited, the closing member (40) assumes an open position relative to said valve seat (41) due to an action of a return spring (59), said valve further comprises the following features:

at an end remote from the tappet, the sleeve (50) is secured in a sealed manner on the valve body (43), the sleeve (50) is connected relative to a pressure-medium outlet (47) of the solenoid valve (14), in the closed position of the closing member (40), the tappet (39) forms a small radial gap (62) in combination with an inner surface of the sleeve, the pressure medium outlet of the seat valve (41) is connected by a first pressure-medium passage (56) to a first chamber (33) relative to that end face (32) of the magnet armature (31) which is remote from the seat valve, at an outlet end of the sleeve (50), a second pressure-medium passage (58) leads to that end face (34) of the magnet armature (31) which is nearer to the seat valve, and the magnet armature (31) is sealed off at a circumferential surface from the valve dome by a sealing means.

2. The solenoid valve as claimed in claim 1, wherein, in a region of common relative surfaces, the tappet (39) and the sleeve (50) are in parallel with a tappet axis (51) and are formed with end faces (52, 55) which extend at right angles to the tappet axis.

3. The solenoid valve as claimed in claim 2, wherein the end face (55) on the tappet (39) is situated at a bottom of a groove (54) which crosses the tappet axis (51) at right angles and from which the first pressure-medium passage (56) leading to that end face (32) of the magnet armature (31) which is remote from the seat valve starts.

* * * * *